(12) United States Patent
Park et al.

(10) Patent No.: US 8,929,850 B2
(45) Date of Patent: Jan. 6, 2015

(54) METHOD AND SYSTEM FOR PREFERENTIALLY CONNECTING DESIGNATED RECEIVER OF EMERGENCY PHONE CALL

(75) Inventors: Jun Hyun Park, Seoul (KR); Min Soo Park, Yongin (KR)

(73) Assignee: S1 Corporation (KR)

( * ) Notice: Subject to any disclaimer, the term of this patent is extended or adjusted under 35 U.S.C. 154(b) by 219 days.

(21) Appl. No.: 13/522,845

(22) PCT Filed: Jan. 22, 2010

(86) PCT No.: PCT/KR2010/000420
§ 371 (c)(1),
(2), (4) Date: Jul. 18, 2012

(87) PCT Pub. No.: WO2011/090227
PCT Pub. Date: Jul. 28, 2011

(65) Prior Publication Data
US 2012/0295573 A1 Nov. 22, 2012

(30) Foreign Application Priority Data
Jan. 22, 2010 (KR) .................. 10-2010-0005814

(51) Int. Cl.
*H04M 11/04* (2006.01)
*H04W 4/22* (2009.01)
*H04W 76/00* (2009.01)

(52) U.S. Cl.
CPC .............. *H04W 4/22* (2013.01); *H04W 76/007* (2013.01)
USPC .................. 455/404.1; 455/404.2; 455/414.1; 455/415

(58) Field of Classification Search
CPC .............................. H04W 4/22; H04W 76/007
USPC .......................... 455/404.1, 404.2, 414.1, 415
See application file for complete search history.

(56) References Cited

U.S. PATENT DOCUMENTS

| | | | |
|---|---|---|---|
| 8,515,040 B2 * | 8/2013 | Wengrovitz | 379/202.01 |
| 8,571,185 B1 * | 10/2013 | Loizeaux | 379/45 |
| 2001/0026223 A1 * | 10/2001 | Menard et al. | 340/573.1 |
| 2009/0186596 A1 * | 7/2009 | Kaltsukis | 455/404.2 |
| 2011/0111728 A1 * | 5/2011 | Ferguson et al. | 455/404.2 |

FOREIGN PATENT DOCUMENTS

| | | |
|---|---|---|
| JP | 2003152902 A | 5/2003 |
| KR | 20070067275 A | 6/2007 |

(Continued)

OTHER PUBLICATIONS

International Search Report for Application No. PCT/KR2010/000420 dated Feb. 28, 2011.

*Primary Examiner* — Temica M Beamer
(74) *Attorney, Agent, or Firm* — Lerner, David, Littenberg, Krumholz & Mentlik, LLP

(57) ABSTRACT

A method and system for preferentially connecting a designated receiver of an emergency phone call are provided. An emergency phone call to a predetermined service organization is made when a specific pattern is input or a specific button is pressed. A service organization receives the emergency phone call, recognizes a user as a ward by determining customer information according to the user's calling ID (CID), and simultaneously requests a phone call connection to a plurality of guardians of the ward according to the user's customer information. When a specific guardian of the plurality of guardians receives a phone call, a phone call between the ward and the specific guardian is connected by using a communication repeater of the service organization.

18 Claims, 4 Drawing Sheets

(56) References Cited

FOREIGN PATENT DOCUMENTS

| KR | 20080025551 A | 3/2008 |
| KR | 100842548 B1 | 7/2008 |
| KR | 20090007072 A | 1/2009 |
| KR | 20090090189 A | 8/2009 |

* cited by examiner

METHOD AND SYSTEM FOR PREFERENTIALLY CONNECTING DESIGNATED RECEIVER OF EMERGENCY PHONE CALL

CROSS REFERENCE TO RELATED APPLICATIONS

The present application is a national phase entry under 35 U.S.C. §371 of International Application No. PCT/KR2010/000420, filed Jan. 22, 2010, published in Korean, which claims priority from Korean Patent Application No. 10-2010-0005814, filed Jan. 22, 2010. The disclosures of said applications are incorporated by reference herein.

TECHNICAL FIELD

The present invention relates to mobile security. More particularly, the present invention relates to a method and system for preferentially connecting a designated receiver of an emergency phone call that provides an importance degree of guardianship and that preferentially connects an emergency phone call according to the importance degree, and that performs an emergency report according to a situation in a conference call when an emergency phone call is connected, as a user is in a specific dangerous situation.

BACKGROUND ART

Efforts to protect human life, security, and material and immaterial assets have been constantly developed, and the range of security thereof is becoming more diversified.

A previous range of security included safes for a home or an office to protect valuables, invasion prevention against computer hackers, and bodyguards for safety of famous people, but a range the security is being enlarged to spot monitoring closed circuit TV, entrance control systems, burglar warning systems, stolen vehicle tracking systems, and fence guard systems for protecting important facilities.

A position determination service for a member using a mobile communication device that is used for a conventional security service may include a global positioning system (GPS) method and a GPSOne method while being serviced by a mobile communication company, and a differential GPS (DGPS), which is a method of obtaining a more accurate position by correcting elements that may cause an error using already known reference point coordinates and largely reducing an error as a GPS measurement technique of a relative positioning method, will soon be commercially available.

When a subscriber is in an emergency situation, a recently executed mobile security service uses a method of pressing a specific emergency rescue button that is formed in a device or directly calling a guardian or a security company in order to notify that an urgent situation is occurring.

However, when a ward attempts to make a phone call to a guardian, when the guardian does not receive the phone call or when a time delay factor occurs in a phone system, the phone call is delayed and thus the phone call connection to the guardian is not performed. When the ward may thus have a problem, in a conventional art, even if a conference call with a plurality of guardians is performed, it is difficult for the guardian to recognize a present situation of the ward. Further, countermeasures may be late due to entanglement of lines, and even if the ward communicates with the guardian, the guardian should again report to the police, and in this case, it is difficult to grasp an actual location of the ward.

DISCLOSURE

Technical Problem

The present invention has been made in an effort to provide a method of preferentially connecting a designated receiver of an emergency phone call having advantages of immediately protecting a ward by providing an opportunity to make a phone call to a plurality of guardians by one emergency phone call of the ward and by increasing a success probability of a phone call with the guardian, when the ward is in an urgent situation.

The present invention has also been made in an effort to further provide a system for preferentially connecting a designated receiver of an emergency phone call having advantages of applying the method of preferentially connecting a designated receiver of an emergency phone call.

Technical Solution

An exemplary embodiment of the present invention provides a method of preferentially connecting a designated receiver of an emergency phone call, the method including: (a) making, by a user, an emergency phone call to a predetermined service organization by inputting a specific pattern to or pressing a specific button of a user terminal; (b) recognizing, by the service organization having received the emergency phone call, the user as a ward by determining customer information according to the user's calling ID (CID) and simultaneously requesting a phone call connection to a plurality of guardians of the ward according to the user's customer information; (c) connecting, when a specific guardian of the plurality of guardians receives a phone call, a phone call between the ward and the specific guardian using a communication repeater of the service organization; and (d) continuously requesting, by the service organization, a phone call connection to another guardian having a higher priority value than that of the specific guardian to which the phone call is connected of a plurality of guardians according to the ward's customer information.

The emergency phone call may include the user's CID information and/or the user's location information.

The customer information may be managed in a family group, and the recognizing of the user as a ward may include determining all persons in the family group except for the user as guardians.

The step of (d) may include notifying a guardian of which a phone call to the ward is not connected of a location and phone call attempt information of the ward, and information of a guardian of which a phone call to the ward is connected.

The step of (d) may further include transmitting, when all phone call connections between the ward and the plurality of guardians have failed, voice guidance that is previously stored in a database of the service organization to the ward's mobile device.

The priority value may be a value that is determined by distance information between the ward and a guardian, family relation information, or a predetermined weight value.

The step of (d) may further include performing, when a phone call to another guardian having a higher priority value than that of the specific guardian is connected, a conference call with the ward.

The step of (d) may further include terminating, when a phone call to another guardian having a higher priority value than that of the specific guardian is connected, a previously connected phone call between the ward and the specific guardian.

Another embodiment of the present invention provides a method of preferentially connecting a designated receiver of an emergency phone call, the method including:

(a) making, by a user, an emergency phone call to a predetermined service organization by inputting a specific pattern to or pressing a specific button of a user terminal; (b) recognizing, by the service organization having received the emergency phone call, the user as a ward by determining customer information according to the user's CID and simultaneously requesting a phone call connection to a plurality of guardians of the ward according to the user's customer information; (c) connecting, when a specific guardian of the plurality of guardians receives a phone call, a phone call between the ward and the specific guardian using a communication repeater of the service organization; and (d) performing an emergency report by recognizing a voice or a key tone of the ward while performing a phone call between the ward and the specific guardian.

The emergency phone call may include the user's CID information and/or the user's location information.

The customer information may be managed in a family group, and the step of (b) may include determining all persons in the family group except for the user as guardians.

The step of (c) may include notifying a guardian of which a phone call connection to the ward is not performed of a location and phone call attempt information of the ward, and information of a guardian of which a phone call to the ward is connected.

The step of (c) may further include transmitting, when all phone call connections between the ward and the plurality of guardians have failed, voice guidance that is previously stored in a database of the service organization to the ward's mobile device.

Another embodiment of the present invention provides a method of preferentially connecting a designated receiver of an emergency phone call, the method including:

(a) making, by a user, an emergency phone call to a predetermined service organization by inputting a specific pattern to or pressing a specific button of a user terminal; (b) recognizing, by the service organization having received the emergency phone call, the user as a ward by determining customer information according to the user's CID and simultaneously requesting a phone call connection to a plurality of guardians of the ward according to the user's customer information; (c) connecting, when a specific guardian of the plurality of guardians receives a phone call, a phone call between the ward and the specific guardian using a communication repeater of the service organization; (d) continuously requesting, by the service organization, a phone call connection to another guardian having a higher priority value than that of the specific guardian of which the phone call is connected of a plurality of guardians according to the ward's customer information; and (d) performing an emergency report by recognizing a voice or a key tone of the ward while performing a phone call according to the priority value.

Yet another embodiment of the present invention provides a system that preferentially connects a designated receiver of an emergency phone call including a ward terminal that performs an emergency phone call of a ward, a service organization that receives the emergency phone call, and a plurality of guardian terminals, wherein the ward terminal includes an emergency phone call driving module that receives an input of a specific pattern or a specific button from the ward, who is a user, and that makes an emergency phone call to a predetermined service organization using a wired or wireless communication network, wherein the service organization includes: a customer information server that stores customer information of the ward and priority values of the plurality of guardians; a receiving controller that receives an emergency phone call from the ward terminal and that recognizes CID information and/or location information of the ward terminal; a transmitting controller that simultaneously requests a phone call connection to a plurality of guardians of the ward according to customer information of the ward; and a communication repeater that connects a phone call between the ward and the plurality of guardians.

The customer information may be managed in a family group, and all persons in the family group except for the ward may be determined as guardians.

The transmitting controller may notify a guardian of which a phone call connection to the ward is not performed of a location and phone call attempt information of the ward, and information of a guardian of which a phone call to the ward is connected.

The transmitting controller may transmit voice guidance that is previously stored in the customer information server to the ward's mobile device, when all phone call connections between the ward and the plurality of guardians have failed.

The priority value may be a value that is determined by distance information between the ward and a guardian, family relation information, or a predetermined weight value.

The communication repeater may perform a conference call with the ward, when a phone call to another guardian having a higher priority value than that of the specific guardian is connected.

The communication repeater may terminate a previously connected phone call between the ward and the specific guardian, when a phone call to another guardian having a higher priority value than that of the specific guardian is connected.

Advantageous Effects

According to the present invention, when an emergency situation of a ward occurs, by one emergency phone call of the ward, an opportunity to connect a phone call to a plurality of guardians is provided, a shortest time connection probability and a communication success probability of a phone call to the guardian are increased, and when phone call connections to all guardians have failed, the mind of the ward is stabilized through a voice output that is previously stored in a server, and upon performing an emergency report to the police, by transmitting CID information and location information of the ward together, a location of the ward can be accurately grasped and thus the ward can be immediately protected.

MODE FOR INVENTION

Figure 1:
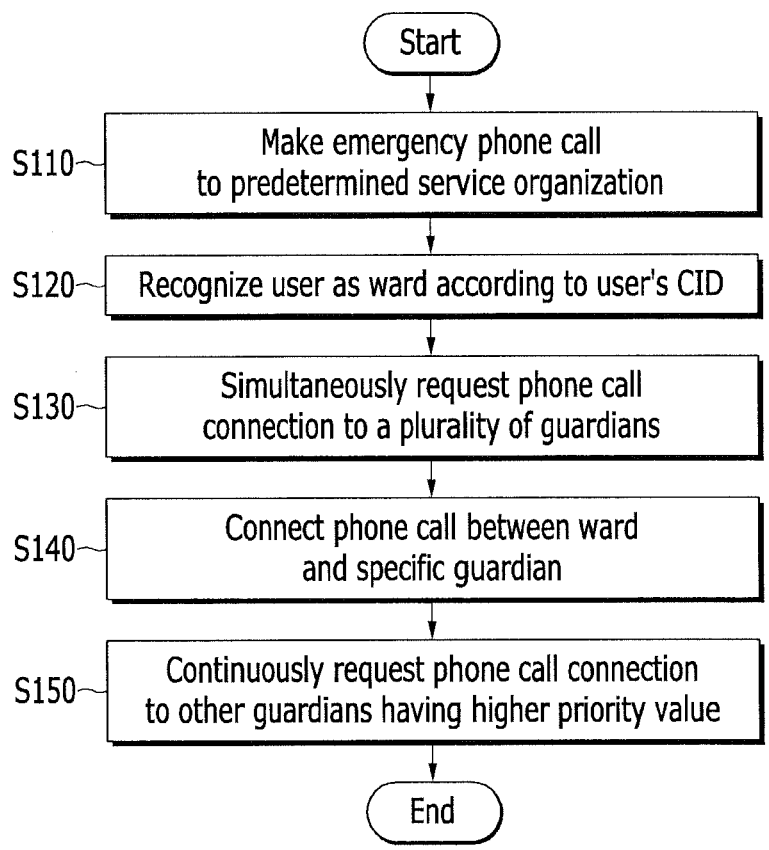
FIG. 1 is a flowchart illustrating a method of preferentially connecting a designated receiver of an emergency phone call according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Hereinafter, the present invention will be described in detail with reference to the drawings.

FIG. 1 is a flowchart illustrating a method of preferentially connecting a designated receiver of an emergency phone call according to an exemplary embodiment of the present invention.

Referring to FIG. 1, a user makes an emergency phone call to a predetermined service organization by inputting a specific pattern to or pressing a specific button of a user terminal (S110). That is, when the user is in a specific dangerous situation, the user makes an emergency phone call by inputting a predetermined specific pattern to or pressing a specific button of the user terminal.

The specific pattern may include a motion pattern and a touch pattern of the mobile device that is performed by the user, and the specific button input may include at least one of pressing an emergency button that is previously disposed in the mobile device and a specific voice input by the user.

Here, 'input of appointed specific pattern information' indicates a process in which an 'appointed specific pattern action' is input by the user and the mobile device recognizes the action.

For example, the specific pattern information may be obtained using a method of repeatedly pressing a specific key or a touch pad or tapping a periphery of the mobile device with a predetermined cycle and receiving the input with a microphone, and this may be variously changed by a person of ordinary skill in the art according to an exemplary embodiment and a design form of the present invention.

An emergency phone call that the service organization receives may include the user's CID information or/and location information that is calculated by a GPS receiving module that is attached to the user terminal.

When the user terminal is a mobile terminal, the mobile terminal receives GPS location information that is grasped by a GPS receiving module, and when the user terminal is a wired or wireless IP phone, or a fixed terminal using a general PSTN network, location information is determined according to address information that is previously determined by the user's CID information.

Thereafter, when the service organization receives an emergency phone call, the service organization determines customer information according to the user's calling ID (CID) and recognizes the user as a ward (S120).

When the service organization receives an emergency phone call of the user, the service organization determines user information according to the user's CID information.

Thereafter, the service organization determines whether the user information is stored at a customer information server of the service organization, and if the user information is stored at a customer information server of the service organization, the service organization recognizes the user that requests the emergency phone call as a ward.

The customer information is managed in a family group and the user is determined as a ward, and all persons in the family group, except for the user, are determined to be guardians.

Thereafter, the service organization simultaneously requests a phone call connection to a plurality of guardians of the ward according to the user's customer information (S130).

That is, in a conventional method, when an emergency situation occurs, a ward makes a phone call to a specific guardian, but when the phone call to the specific guardian is not connected, the ward should make a phone call to another guardian, but this is not a realistic method to cope with an emergency situation.

Therefore, in the present invention, when an emergency phone call is received from a user, a phone call is simultaneously performed to all persons other than the user based on customer information, particularly, a family group that is previously determined in the service organization, and the service organization performs the phone call. Here, the plurality of guardians receive incoming calls from the service organization, caller ID that is displayed in terminals of the plurality of guardians may be embodied in various forms, and this uses a method of loading and transmitting a phone number to be described later to a CID protocol of communication protocols.

This may enable the ward's phone number to display in the plurality of guardian terminals, enable the service organization's phone number to display in the plurality of guardian terminals, or enable a specific phone number that is previously determined by members of the family group to display in the plurality of guardian terminals.

This may be variously changed according to an exemplary embodiment or a design form of the present invention.

Thereafter, when a specific guardian of the plurality of guardians receives a phone call, a phone call between the ward and the specific guardian is connected using a communication repeater of the service organization (S140).

Thereafter, the service organization continuously requests a phone call connection with other guardians having a higher priority value than that of the specific guardian to which the phone call is connected in a plurality of guardians according to the ward's customer information (S150).

That is, even if a phone call between the ward and the specific guardian is connected by the communication repeater, it is necessary to notify a more important guardian that the ward is in a dangerous situation.

Therefore, in the exemplary embodiment of the present invention, even if a phone call between the ward and the specific guardian is connected, a request for a phone call connection is continuously performed to other guardians having a higher priority value than that of the specific guardian to which the phone call is connected.

The priority value may be set based on distance information between the ward and the guardian, and this is because the nearest guardian can most easily solve an emergency situation of the ward.

Further, the priority value may be set based on family relationship information with the ward, and information on the degree of kinship may be one reference factor.

When the degree of kinship between at least two guardians is identical, the nearest guardian based on the distance information may have the highest priority value.

Further, the priority value may be set by a weight value that is previously determined by persons belonging to the family group, and when a weight value is previously determined, a ward's weight value that is determined according to a situation is multiplied by other guardians' weight value, and a guardian having the largest result value has a highest priority value.

Here, when a phone call to another guardian having a higher priority value than that of the specific guardian is connected, a conference call may be performed between the ward, the specific guardian, and another guardian having the highest priority value.

Alternatively, a phone call connection is attempted with another guardian having a higher priority value than that of the specific guardian, and when the phone call is connected to the other guardian having the higher priority value than that of the specific guardian, a previously connected phone call between the ward and the specific guardian may be terminated.

In the exemplary embodiment of the present invention, the location and phone call attempt information of the ward and information of a guardian to which a phone call to the ward is connected may be notified to other guardians with whom a phone call to the ward is not connected in the family group.

For this purpose, all of the ward and the guardians should previously agree to provide location information thereof to another person according to law on the protection and use of location information.

A method of notifying a ward's location to a plurality of guardians may use a method of notifying the ward's location with an SMS message, and when a guardian terminal is a smart phone, map information or information of latitude and longitude of a location of the ward according to a geographic information system (GIS) may be notified to the smart phone, and the guardians can accurately grasp the ward's location information through the guardian terminals based on the information.

Further, a peripheral situation of the ward may be transmitted to the guardian in a form of a moving picture file or a voice file.

Therefore, even a guardian of which a phone call to the ward is not connected can quickly recognize that the ward is in a dangerous situation.

Further, when all phone call connections between the ward and the plurality of guardians have failed, voice guidance that is previously stored at a database of the service organization may be transmitted to the ward's mobile device.

That is, by outputting an inquiry that is previously stored at the database to the user through the mobile device, speech recognition is performed.

In order for the user to perform an individual call and an emergency report, the inquiry may be selected from inquiries that are constructed to a database, and a response pattern to the inquiry may be previously designated.

Thereby, when an actual situation occurs, an inquiry that is previously stored at a database is output, and when the user performs a reply of a predesignated form, a mobile device performs speech recognition of the user's voice, outputs a response pattern, and performs an action following guidelines that are previously stored in the database according to speech recognition and a response pattern of the user.

When the user's speech recognition is successfully performed, a guideline that is previously stored at the database is output to the mobile device, and when the user replies in a previously appointed form such as "Yes", "No", or "Well", situation measures are performed by the previously stored guideline.

Figure 2:
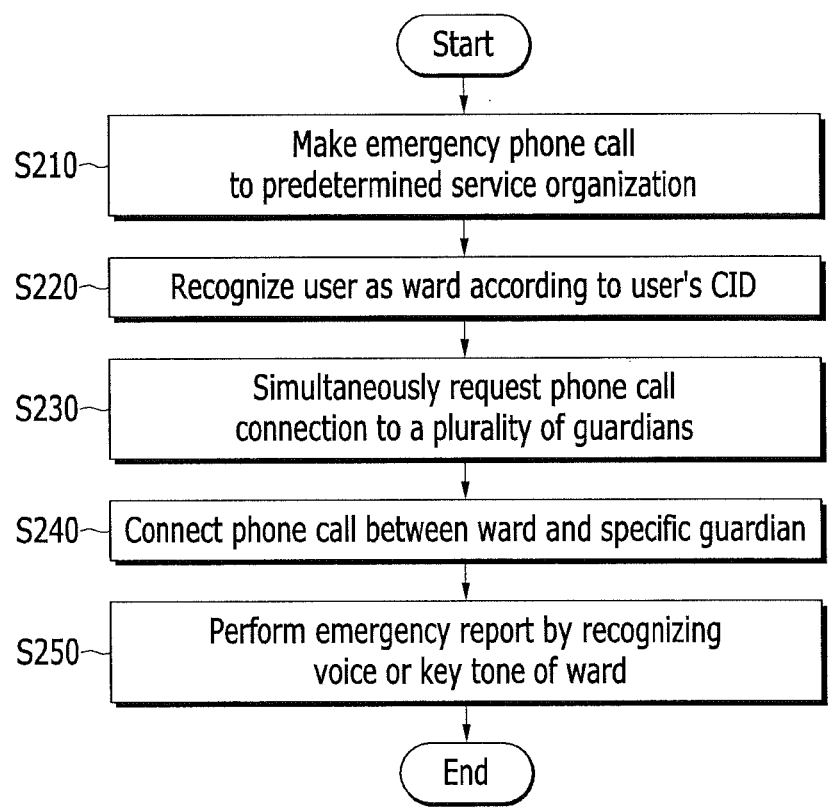
FIG. 2 is a flowchart illustrating a method of preferentially connecting a designated receiver of an emergency phone call according to another exemplary embodiment of the present invention.

FIG. 2 is a flowchart illustrating a method of preferentially connecting a designated receiver of an emergency phone call according to another exemplary embodiment of the present invention.

In the detailed description of FIG. 2, a description of constituent elements identical to or corresponding to those of the foregoing exemplary embodiment will be omitted.

Referring to FIG. 2, a user makes an emergency phone call to a predetermined service organization by inputting a specific pattern to or pressing a specific button of a user terminal (S210).

Here, the emergency phone call may include the user's CID information and/or the user's location information.

Thereafter, the service organization having received the emergency phone call determines customer information according to the user's CID and recognizes the user as a ward (S220), and the service organization simultaneously requests a phone call connection to a plurality of guardians of the ward according to the user's customer information (S230).

The customer information is managed in a family group, and all persons may be determined to be guardians, except for the user in the family group.

Thereafter, when a specific guardian of the plurality of guardians receives a phone call, a phone call between the ward and the specific guardian is connected using a communication repeater of the service organization (S240).

Finally, by recognizing a voice or a key tone of the ward while a phone call between the ward and the specific guardian is performed, the service organization performs an emergency report (S250).

That is, while the phone call is performed between the ward and the specific guardian, when a very urgent situation occurs, if the ward makes a predetermined utterance, or if the ward presses a specific button and a key tone thereof is recognized, the service organization performs an emergency report.

Specifically, when the ward says '911', or when the ward presses '911' of numeral buttons and a communication repeater of the service organization recognizes this, the service organization may perform an emergency report, and the emergency report may be performed to a national organization that is related to the police such as '911'.

A location and phone call attempt information of the ward and information of a guardian of which a phone call to the ward is connected may be notified to other guardians to which a phone call to the ward is not connected among a plurality of guardians in the family group.

When all phone call connections between the ward and the plurality of guardians have failed, voice guidance that is previously stored in a database of the service organization may be transmitted to the ward's mobile device.

Figure 3:
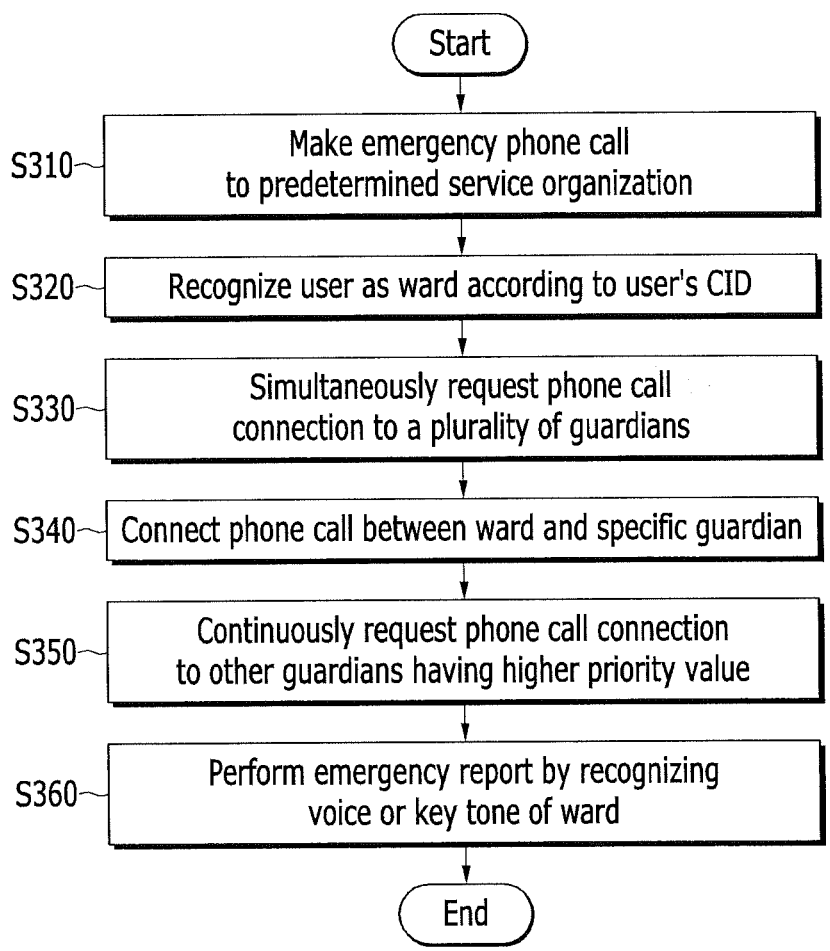
FIG. 3 is a flowchart illustrating a method of preferentially connecting a designated receiver of an emergency phone call according to another exemplary embodiment of the present invention.

FIG. 3 is a flowchart illustrating a method of preferentially connecting a designated receiver of an emergency phone call according to another exemplary embodiment of the present invention.

In the detailed description of FIG. 3, a description of constituent elements identical to or corresponding to those of the foregoing exemplary embodiments of FIGS. 1 and 2 will be omitted.

First, a user makes an emergency phone call to a predetermined service organization by inputting a specific pattern to or pressing a specific button of a user terminal (S310).

Thereafter, the service organization having received the emergency phone call determines customer information according to the user's CID and recognizes the user as a ward (S320).

Thereafter, the service organization simultaneously requests a phone call connection to a plurality of guardians of the ward according to the user's customer information (S330).

Thereafter, when a specific guardian of the plurality of guardians receives a phone call, the phone call between the ward and the specific guardian is connected using a communication repeater of the service organization (S340).

Thereafter, the service organization continuously requests a phone call connection to other guardians having a higher priority value than that of the specific guardian to which the phone call is connected of a plurality of guardians according to the ward's customer information (S350).

Finally, by recognizing a voice or a key tone of the ward while performing a phone call according to a priority value, the service organization performs an emergency report (S360).

Figure 4:
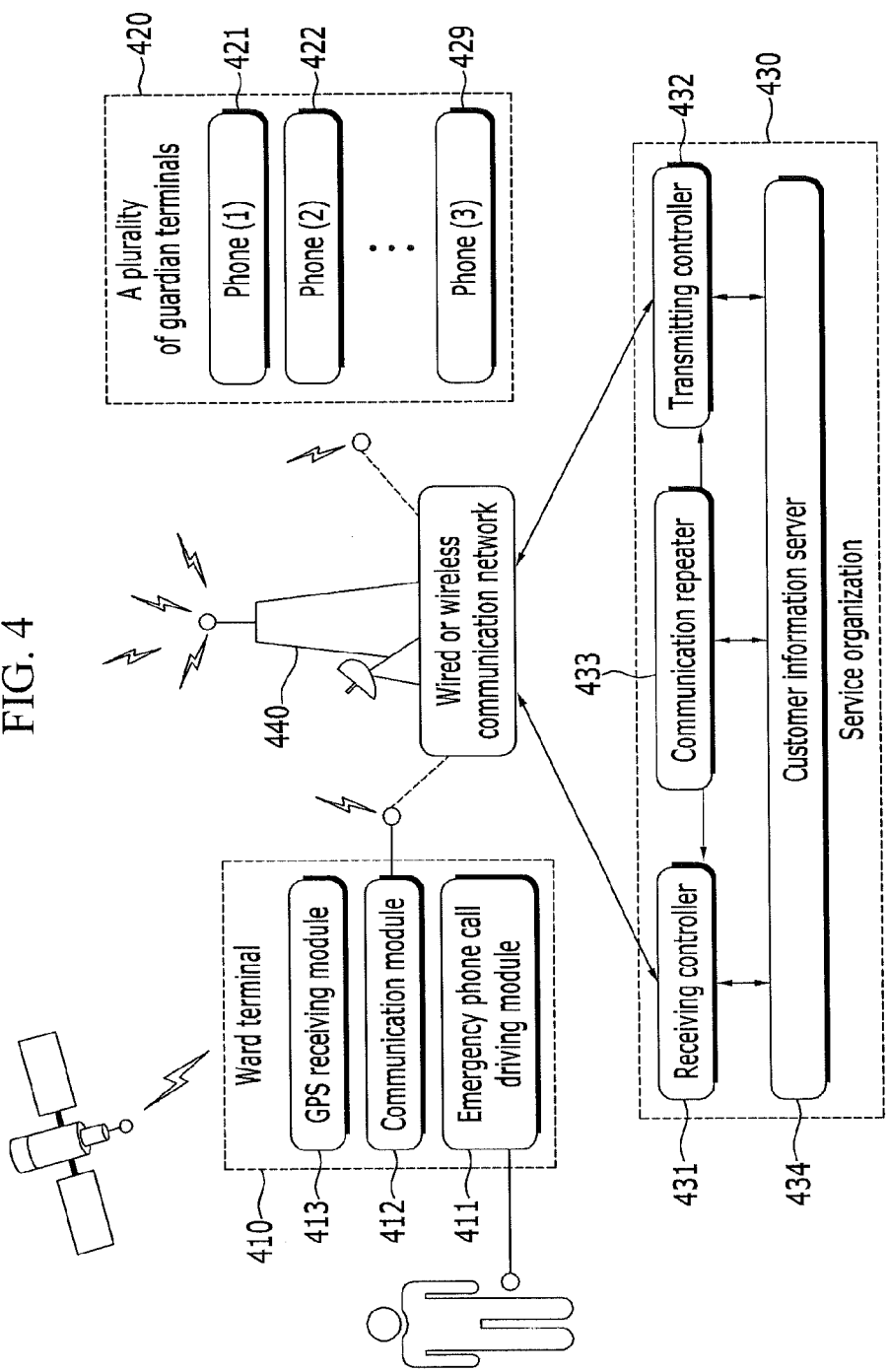
FIG. 4 is a diagram illustrating a system for preferentially connecting a designated receiver of an emergency phone call according to an exemplary embodiment of the present invention.

FIG. 4 is a diagram illustrating a system for preferentially connecting an emergency phone call to a designated receiver according to an exemplary embodiment of the present invention.

Referring to FIG. 4, the system for preferentially connecting a designated receiver of an emergency phone call according to an exemplary embodiment of the present invention includes a ward terminal 410 that makes an emergency phone call of a ward, a plurality of guardian terminals 420, and a service organization 430 that receives the emergency phone call.

Here, the ward terminal 410 includes an emergency phone call driving module 411, a communication module 412, and a GPS receiving module 413, and the service organization 430 includes a receiving controller 431, a transmitting controller 432, a communication repeater 433, and a customer information server 434.

When the ward terminal 410 is a mobile terminal, the GPS receiving module 413 of the ward terminal 410 receives location information by a GPS satellite, and the communication module 412 performs wired and wireless communication with a wired or wireless communication network 440.

The wired or wireless communication network 440 may include communication networks such as an IP network, PSTN, CDMA, 3G, and 4G, and positioning may use a base station method and an IP address method as well as a GPS receiving module.

The emergency phone call driving module 411 receives an input of a specific pattern or a specific button from a ward, who is a user, and makes an emergency phone call to a predetermined service organization 430 using the wired or wireless communication network 440.

The receiving controller 431 of the service organization receives an emergency phone call from the ward terminal 410 and recognizes CID information and/or location information of the ward terminal 410.

The transmitting controller 432 simultaneously requests a phone call connection to a plurality of guardians of the ward according to the ward's customer information.

Here, the customer information is managed in a family group, and all persons in the family group may be determined to be guardians except for the ward.

The transmitting controller 432 may notify other guardians with which a phone call to the ward is not connected of a location and phone call attempt information of the ward and information of a guardian with which a phone call to the ward is connected, and when all phone call connections between the ward and the plurality of guardians have failed, the transmitting controller 432 may transmit voice guidance that is previously stored at a customer information server to the ward's mobile device.

That is, by outputting an inquiry that is previously stored in a database to the user through the mobile device, speech recognition is performed.

In order for the user to perform an individual call and an emergency report, the inquiry may be selected from inquiries that are constructed in a database, and a response pattern to the inquiry may be previously designated.

Thereby, when an actual situation occurs, an inquiry that is previously stored at the database is output, and when the user performs a reply of a predesignated form, the mobile device performs speech recognition of the user's voice, outputs a response pattern, and performs an action following a guideline that is previously stored at the database according to speech recognition and a response pattern of the user.

The communication repeater 433 connects a phone call between the ward and the plurality of guardians, and after a phone call between the ward and a specific guardian is connected, when a phone call is connected to another guardian having a priority value higher than that of the specific guardian, a conference call may be performed between the ward, the specific guardian, and another guardian having a highest priority value.

Further, when a phone call to another guardian having a higher priority value than that of the specific guardian is connected, by terminating a previously connected phone call between the ward and the specific guardian, the communication repeater 433 guides a guardian having a higher priority value and the ward to perform communication.

Here, the priority value may be a value that is determined by distance information between the ward and the guardian, family relation information, or a predetermined weight value.

A method of preferentially connecting a designated receiver of an emergency phone call according to an exemplary embodiment of the present invention may be executed through software. When the method is executed with software, constituent elements of the present invention are code segments that execute necessary work.

A program or code segments may be stored in a processor readable medium or may be transmitted by a computer data signal that is coupled to

What is claimed is:

1. A method of preferentially connecting a designated receiver of an emergency phone call, the method comprising:
    (a) making, by a user, an emergency phone call to a predetermined service organization by inputting a specific pattern to or pressing a specific button of a user terminal;
    (b) recognizing, by the service organization having received the emergency phone call, the user as a ward by determining customer information according to the user's calling ID (CID) and simultaneously requesting a phone call connection to a plurality of guardians of the ward according to the user's customer information;
    (c) connecting, when a specific guardian of the plurality of guardians receives a phone call, a phone call between the ward and the specific guardian using a communication repeater of the service organization; and (d) continuously requesting, by the service organization, a phone call connection to another guardian having a higher priority value than that of the specific guardian to which the phone call is connected of a plurality of guardians according to the ward's customer information, wherein a guardian that is not connected to the ward is notified of i) a location and phone call attempt information of the ward and ii) information of the specific guardian that is connected to the ward.

2. The method of claim 1, wherein the emergency phone call comprises the user's CID information and/or the user's location information.

3. The method of claim 1, wherein the customer information is managed in a family group, and the step of (b) comprises determining all persons in the family group except for the user as guardians.

4. The method of claim 1, wherein the step of (d) further comprises transmitting, when all phone call connections between the ward and the plurality of guardians have failed, voice guidance that is previously stored in a database of the service organization to the ward's mobile device.

5. The method of claim 1, wherein the priority value is a value that is determined by distance information between the ward and a guardian, family relation information, or a predetermined weight value.

6. The method of claim 1, wherein the step of (d) further comprises performing, when a phone call to another guardian having a higher priority value than that of the specific guardian is connected, a conference call with the ward.

7. The method of claim 1, wherein the continuously requesting of a phone call connection further comprises terminating, when a phone call to another guardian having a higher priority value than that of the specific guardian is connected, a previously connected phone call between the ward and the specific guardian.

8. A method of preferentially connecting a designated receiver of an emergency phone call, the method comprising:

(a) making, by a user, an emergency phone call to a predetermined service organization by inputting a specific pattern to or pressing a specific button of a user terminal;

(b) recognizing, by the service organization having received the emergency phone call, the user as a ward by determining customer information according to the user's CID and simultaneously requesting a phone call connection to a plurality of guardians of the ward according to the user's customer information;

(c) connecting, when a specific guardian of the plurality of guardians receives a phone call, a phone call between the ward and the specific guardian using a communication repeater of the service organization; and (d) performing an emergency report by recognizing a voice or a key tone of the ward while performing a phone call between the ward and the specific guardian, wherein a guardian that is not connected to the ward is notified of i) a location and phone call attempt information of the ward and ii) information of the specific guardian that is connected to the ward.

9. The method of claim 8, wherein the emergency phone call comprises the user's CID information and/or the user's location information.

10. The method of claim 8, wherein the customer information is managed in a family group, and the step of (b) comprises determining all persons in the family group except for the user as guardians.

11. The method of claim 8, wherein the step of (c) further comprises transmitting, when all phone call connections between the ward and the plurality of guardians have failed, voice guidance that is previously stored in a database of the service organization to the ward's mobile device.

12. A system that preferentially connects a designated receiver of an emergency phone call comprising a ward terminal that performs an emergency phone call of a ward, a service organization that receives the emergency phone call, and a plurality of guardian terminals, wherein the ward terminal comprises an emergency phone call driving module that receives an input of a specific pattern or a specific button from the ward, who is a user, and that makes an emergency phone call to a predetermined service organization using a wired or wireless communication network, wherein the service organization comprises:

a customer information server that stores customer information of the ward and priority values of the plurality of guardians;

a receiving controller that receives an emergency phone call from the ward terminal and that recognizes CID information and/or location information of the ward terminal;

a transmitting controller that simultaneously requests a phone call connection to a plurality of guardians of the ward according to customer information of the ward, wherein the transmitting controller notifies a guardian that is not connected to the ward of i) a location and phone call attempt information of the ward and ii) information of the specific guardian that is connected to the ward; and a communication repeater that connects a phone call between the ward and the plurality of guardians.

13. The system of claim 12, wherein the customer information is managed in a family group, and all persons in the family group except for the ward are determined as guardians.

14. The system of claim 12, wherein the transmitting controller transmits voice guidance that is previously stored in the customer information server to the ward's mobile device, when all phone call connections between the ward and the plurality of guardians have failed.

15. The system of claim 12, wherein the priority value is a value that is determined by distance information between the ward and the guardian, family relation information, or a predetermined weight value.

16. The system of claim 12, wherein the communication repeater performs a conference call with the ward, when a phone call to another guardian having a higher priority value than that of the specific guardian is connected.

17. The system of claim 12, wherein the communication repeater terminates a previously connected phone call between the ward and the specific guardian when a phone call to another guardian having a higher priority value than that of the specific guardian is connected.

18. The method of claim 1, wherein a pair of guardians have the same priority level, determining that the guardian nearest the ward has a higher priority value.

* * * * *